No. 632,717. Patented Sept. 12, 1899.
A. J. HUGHES & D. C. HINDMAN.
CHECK ROW CORN PLANTER.
(Application filed May 9, 1898.)
(No Model.) 5 Sheets—Sheet 1.
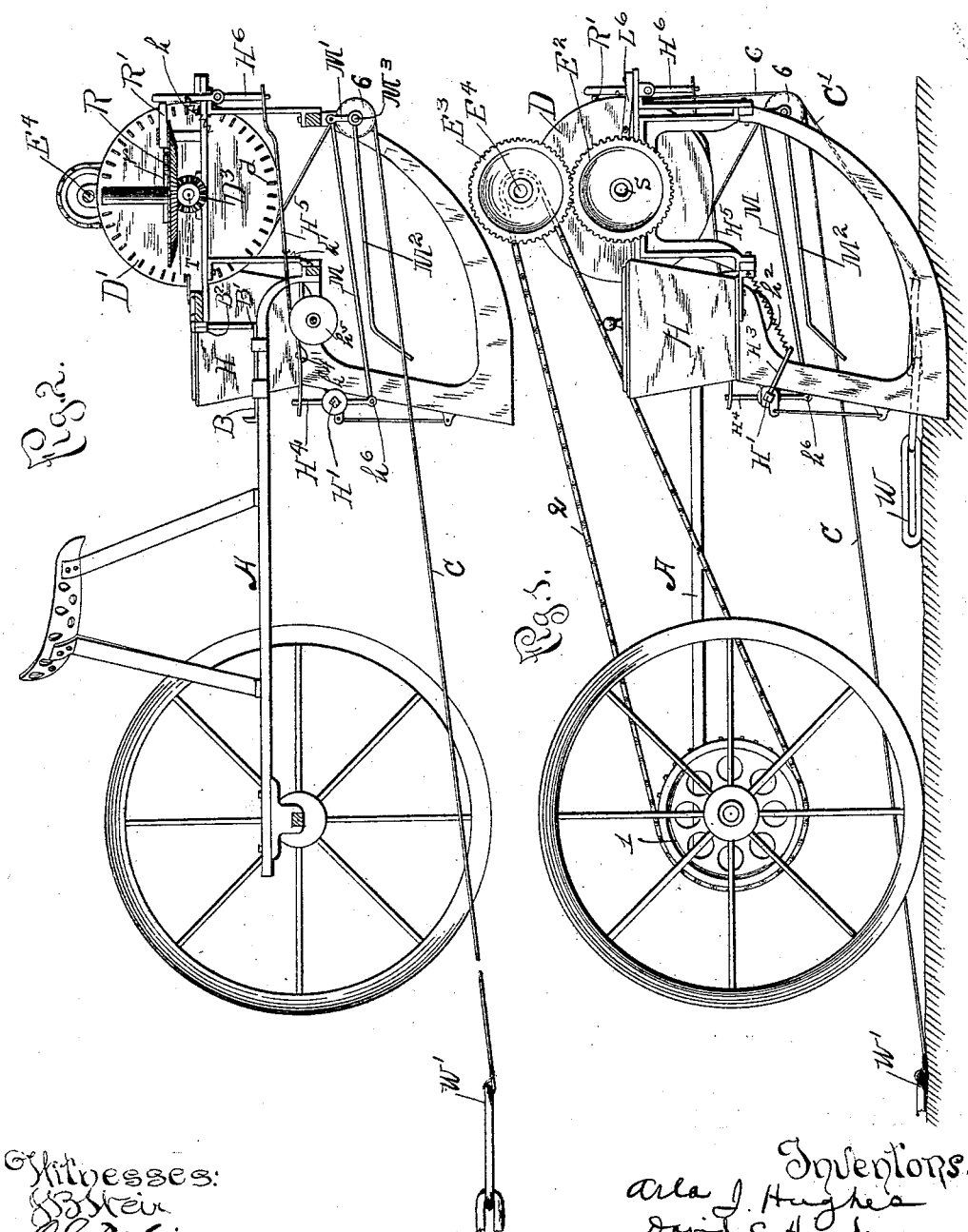

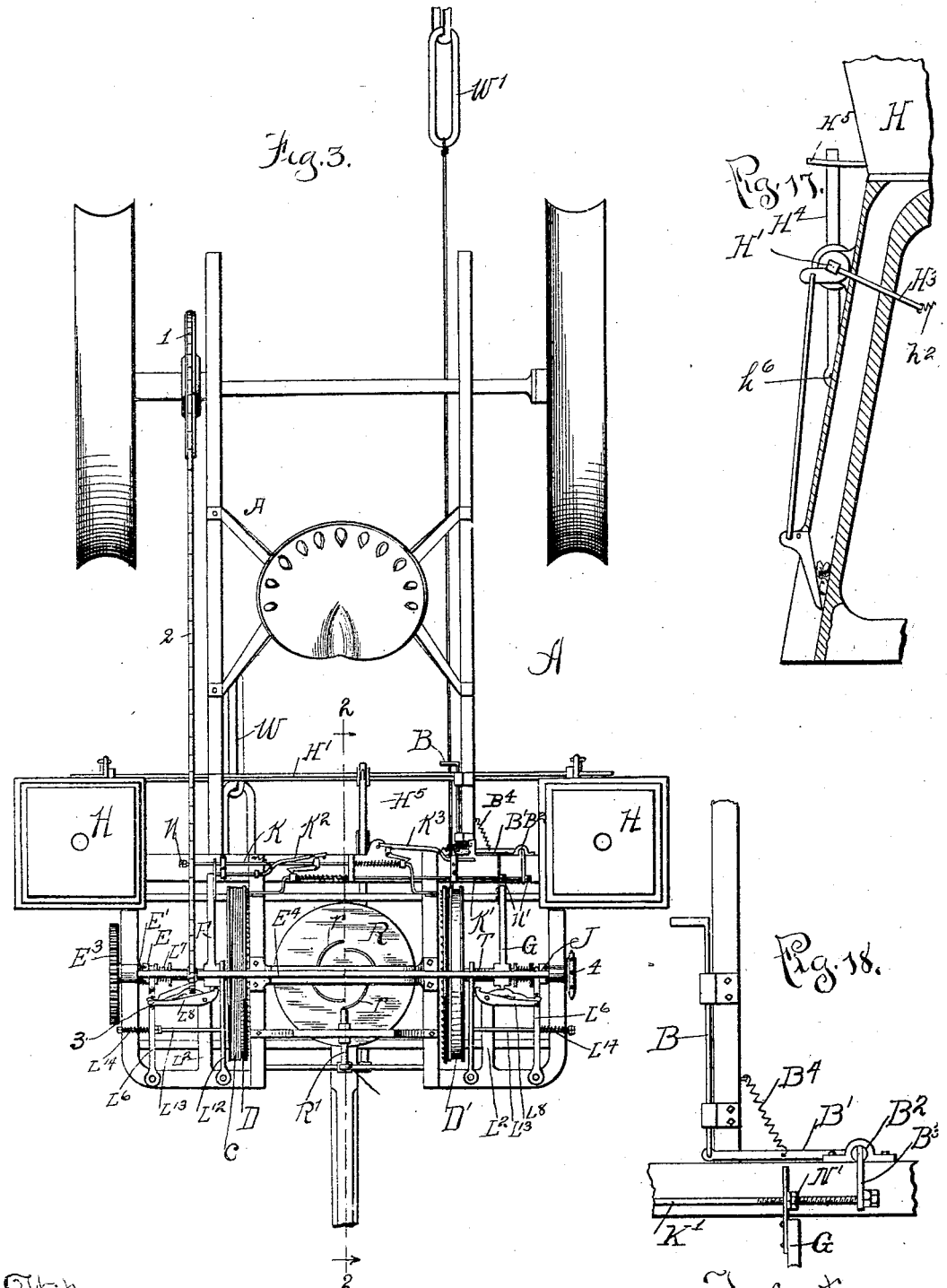

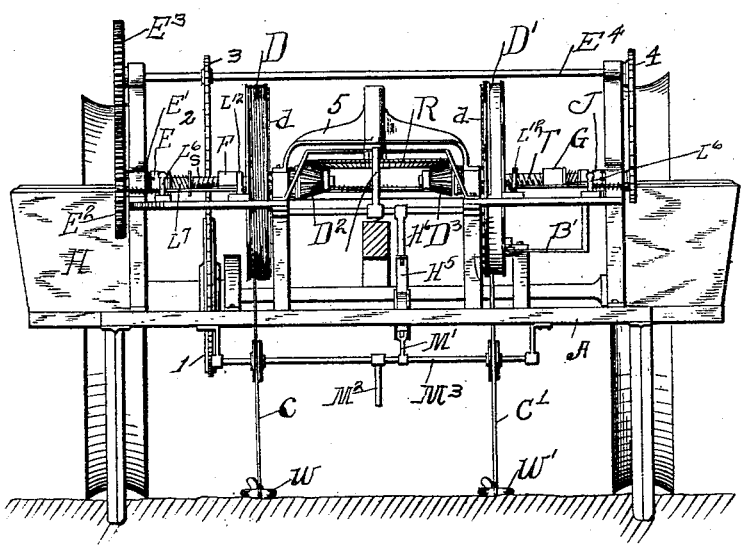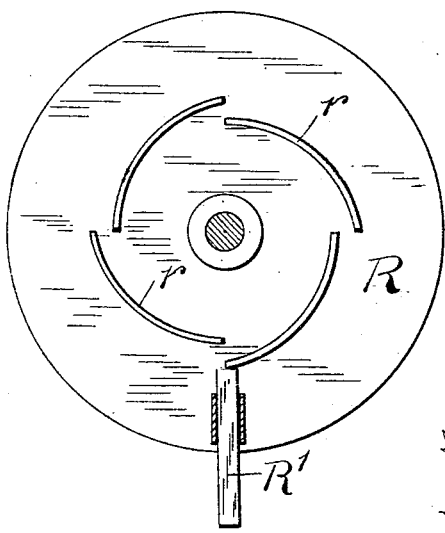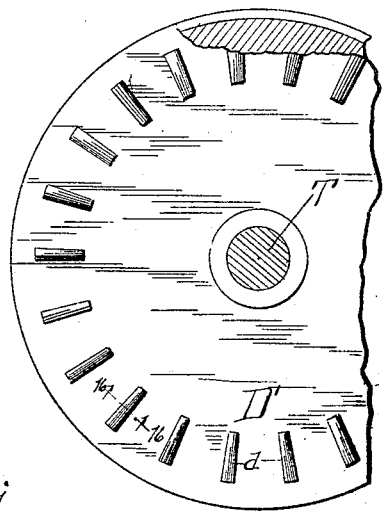

No. 632,717. Patented Sept. 12, 1899.
A. J. HUGHES & D. C. HINDMAN.
CHECK ROW CORN PLANTER.
(Application filed May 9, 1898.)
(No Model.) 5 Sheets—Sheet 4.
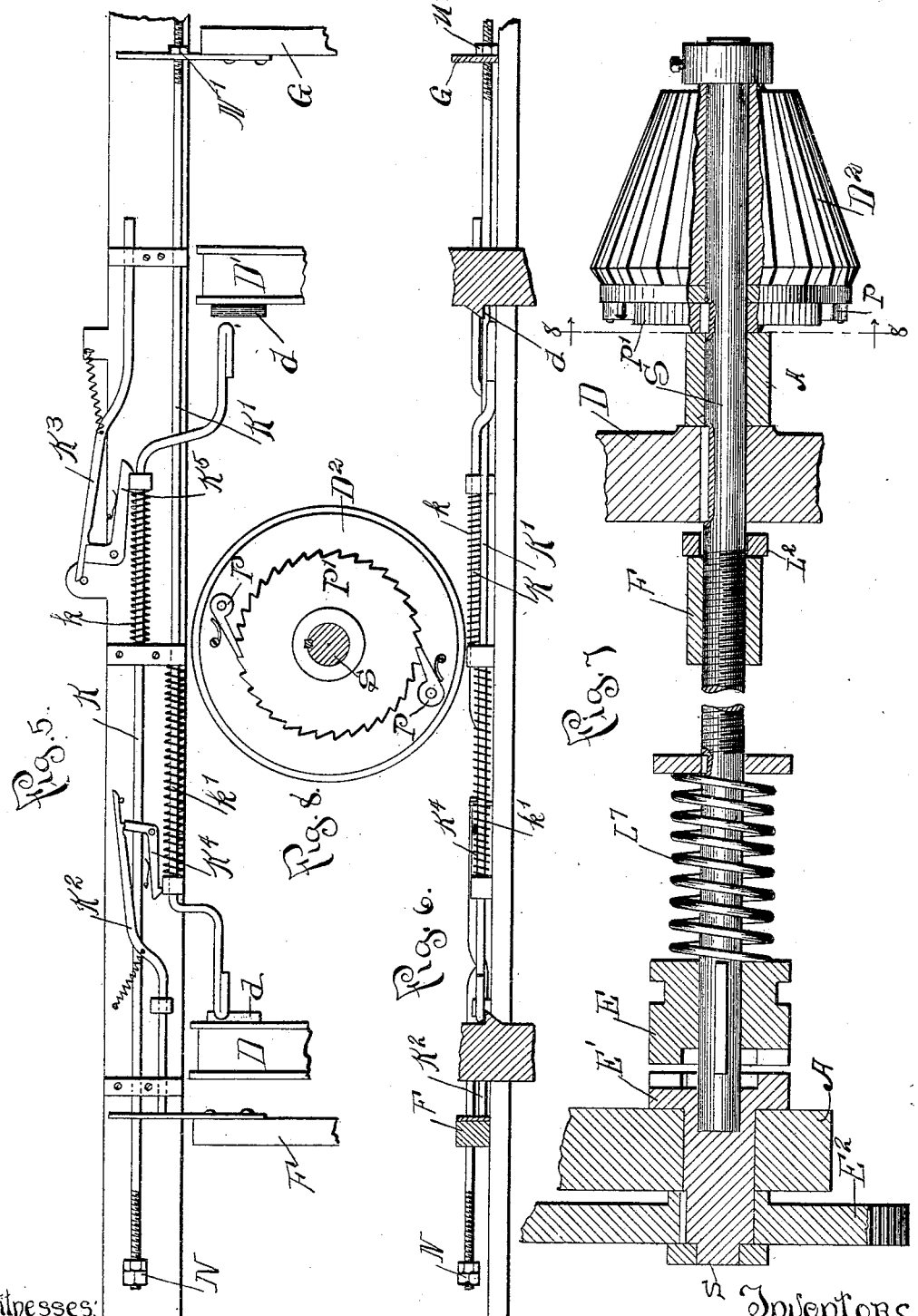

No. 632,717. Patented Sept. 12, 1899.
A. J. HUGHES & D. C. HINDMAN.
CHECK ROW CORN PLANTER.
(Application filed May 9, 1898.)
(No Model.) 5 Sheets—Sheet 5.
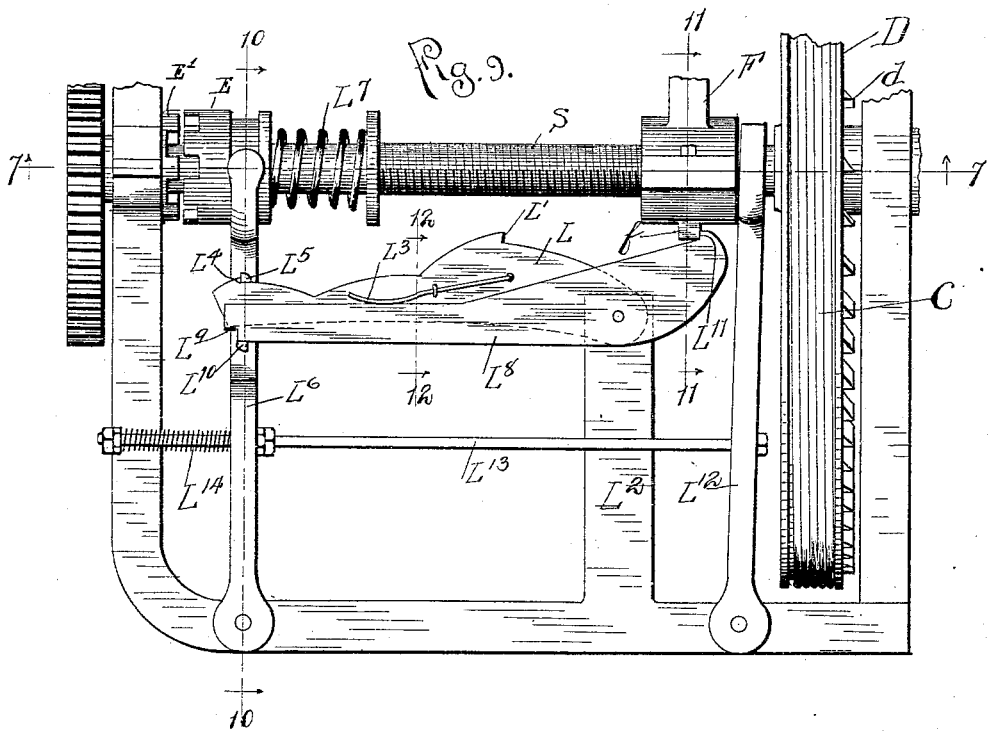
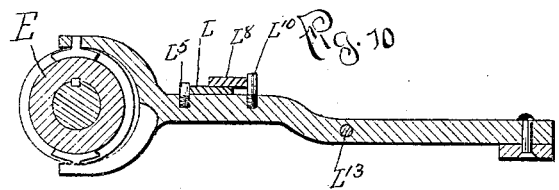
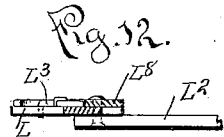
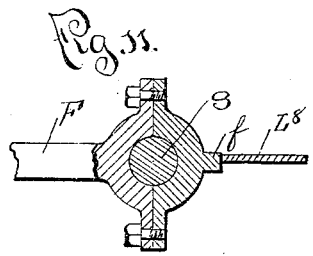
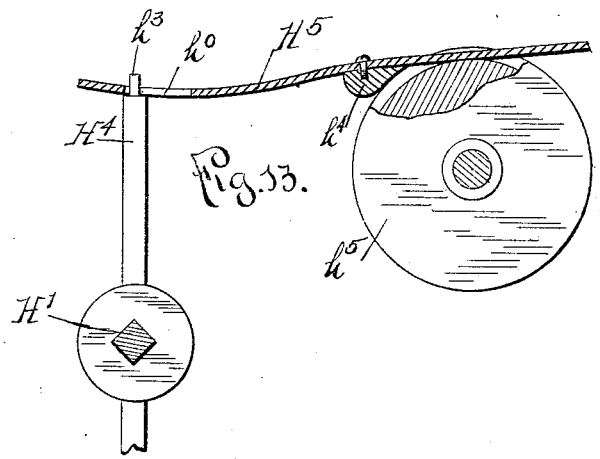
Witnesses:
Inventors
Arla J. Hughes
David C. Hindman
By W. E. Williams atty.
THE NORRIS PETERS CO., PHOTO-LITHO., WASHINGTON, D. C.

UNITED STATES PATENT OFFICE.

ARLA J. HUGHES AND DAVID C. HINDMAN, OF RUSHVILLE, ILLINOIS.

CHECK-ROW CORN-PLANTER.

SPECIFICATION forming part of Letters Patent No. 632,717, dated September 12, 1899.

Application filed May 9, 1898. Serial No. 680,144. (No model.)

*To all whom it may concern:*

Be it known that we, ARLA J. HUGHES and DAVID C. HINDMAN, citizens of the United States of America, and residents of Rushville, Schuyler county, Illinois, have invented certain new and useful Improvements in Check-Row Corn-Planters, of which the following is a specification.

The object of the invention is to provide a corn-planter which without the aid of a check-wire will place the hills in proper position and mark the place of each hill.

We mount upon the planter-frame drums, each bearing a cable which has attached to its free end a weight or anchor to lie upon or engage with the ground. When the planter advances, the resistance of each anchor to movement tends to hold the end of the cable fast, and thus to rotate in a certain direction the drum upon which the cable is wound. Each drum when rotated in a forward direction actuates the planter's dropping mechanism, and the resistance of either weight is amply sufficient to thus operate the dropping devices. Either drum, or both of them, may be locked against rotation in the forward direction, and thus either or both the weights may be carried on with the planter without in any way acting upon the dropping devices. Either drum may be rotated positively in the contrary direction to rewind the cable by throwing into engagement mechanism operated, as the moving parts of planters are usually operated, from the planter's supporting-wheels; but such rotation does not affect the dropping devices. In the use of the machine one of the drums is unlocked, so that its cable, held by the anchor while the planter advances, may rotate the drum and actuate the dropper. After a predetermined amount of rotation this drum unlocks the other and is afterward itself rotated in a reverse direction automatically to rewind its cable and is then locked, preventing the cable from being again paid out until this drum is in turn unlocked by the second. Thus as the machine advances the two cables are alternately paid out and rewound, and the dropping goes on uniformly and indefinitely.

In the drawings, Figures 1, 2, 3, and 4 are respectively side, sectional, plan, and front views of the machine as a whole. Figs. 5 and 6 are respectively plan view and front elevation of certain locking and winding mechanism. Fig. 7 is a section on the line 7 7, Fig. 9. Fig. 8 is a section on the line 8 8, Fig. 7. Fig. 9 is a detail view of parts of the winding mechanism. Figs. 10, 11, and 12 are sections on the lines 10 10, 11 11, 12 12, respectively, of Fig. 9. Figs. 13, 14, 15, 16, 17, and 18 are detail views.

In the figures, A represents the frame of a planter, and D D' are drums mounted thereon. C C' are cables for rotating in one direction the drums upon which they are wound, and W W' are preferably chain-like anchors or weights attached to the free ends of the cables, respectively, and normally lying upon the ground beneath or in the rear of the planter. The drum-shafts S T bear at their inner ends, respectively, pinions $D^2 D^3$, which engage, upon opposite sides thereof, a geared disk R, and that the two pinions when rotated by the cables may tend to rotate the disk in the same direction the cables are oppositely wound upon the drums. The drums are rigidly fixed to their shafts, while the pinions are loose thereon, but provided with spring-pawls P, which engage ratchet-wheels P', fixed to the shafts, whenever the drums are rotated by their cables, but slip over the ratchet-wheels when the shafts are rotated in the reverse direction. The disk is thus rotated in one direction only and is so rotated whenever there is cable-induced rotation of either or both the drums. Both drums may be locked against rotation by the cables by sliding rods K K' engaging teeth $d$ upon the drums, respectively. If one be locked and the other unlocked and if the planter advance, the weight attached to the unlocked drum ceases to advance with the planter and by exerting a virtual pull upon its cable turns the drum and rotates the disk R. As the drum-shaft thus rotates an arm F or G, working on a threaded part of the shaft, travels along the shaft and away from the drum. Before the cable is fully unwound this moving arm strikes a nut N or N' upon the rod K or K', slides the rod, and unlocks the other drum, and the second weight ceasing to advance with the planter both drums for the moment act in unison to rotate the disk R. The rod K or K' when retracted is locked by a pawl $K^4$, itself held by a trip $K^2$, lying in position to be struck at the proper time by the arm G or F and forced thereby to lift the pawl and allow the rod to again lock the corresponding drum. In the further advance of the arm F, for example, this being the arm the action of which is most fully illustrated, Figs. 7 to 11, a lug $f$ upon that arm strikes a stop $L'$ upon an arm L, pivoted to a member $L^2$ of the frame, overcomes the force of a spring $L^3$, swings the latter arm, and thus causes a catch $L^4$ to release a projection $L^5$ upon another arm $L^6$, which holds a clutch member E out of engagement with a corresponding member $E'$, carried by a constantly-rotating gear $E^2$. A spring $L^7$ then throws the clutch into engagement, and a pivoted arm $L^8$ swings and engages a shoulder $L^9$ with a projection $L^{10}$ upon the arm $L^6$, thus locking the clutch in engagement. The gear $E^2$ now reverses the motion of the shaft and arm F, leaving the pinion $D^2$ at rest, but rewinding the cable. Meantime the other arm G has been traveling along its shaft, and at the proper time it releases the rod which locks the drum D. As the arm F travels back toward the drum it strikes a stop $L^{11}$ upon an arm $L^8$ and swings the latter, releasing the projection $L^{10}$ or unlocking the clutch. In its further advance the arm F swings an arm $L^{12}$, which, acting through a rod $L^{13}$, spring $L^{14}$, and the arm $L^6$, draws the clutch out of engagement to be locked, as at first, by the catch $L^4$ and projection $L^5$.

The gear $E^2$, above mentioned, is constantly rotated from the supporting-wheels of the planter by a sprocket-wheel 1, chain 2, sprocket-wheel 3, shaft $E^4$, and gear $E^3$. The shaft $E^4$, acting through sprocket-and-chain mechanism 4, also rotates constantly one member of a clutch J, having the same relation to the shaft T that the clutch before-mentioned has to the shaft S.

Upon the disk R are cam-like projections $r$, in the path of which normally lies one end of a bar $R'$, mounted in the frame A to slide radially with respect to the disk. As the disk rotates the projections successively force the bar outward against the upper end of a centrally-pivoted lever $H^6$ and then allow it to return suddenly under the force of a spring $h$, which resists the outward movement of the lever. To the lower end of this lever is pivoted a link $H^5$, which lies in the groove of a pulley $h^5$ and is normally held above the bottom of the groove by a wedge-shaped block $h^4$, fixed to the link. Near its free end the link has a slot $h^0$, and as the lever $H^6$ forces the link longitudinally rearward the block $h^4$ leaves the pulley and the link falls while in such position that a gudgeon $h^3$ upon the end of a lever $H^4$ enters the slot, as is clearly seen in Fig. 13. The lever just mentioned is an arm from a rock-shaft $H'$, the movement of which operates ordinary dropping mechanism, as shown in Fig. 17. As the lever $H^6$ is returned to position by the spring $h$ the link first swings the arm $H^4$, actuating the dropping devices and then against the resistance of a spring $h'$ is raised off the gudgeon by the block $h^4$ as the latter again rides up upon the pulley. The released arm $H^4$ is instantly returned to position by a spring $h^2$, Figs. 1 and 17. The place of the seed dropped by the action of devices just described is marked by means of an arm $h^6$ from the rock-shaft, a rod M, and a marker $M'$ $M^2$, rocking upon a pivot-shaft $M^3$.

Usually the cables are both fully wound upon the drums at the outset, and the drums are both locked, so that the machine may move from place to place without dropping seed. To set the dropping devices in operation, the attendant slides the rod B, Fig. 18, with his foot, overcoming the force of a spring $B^4$ and swinging a bell-crank lever $B'$ $B^3$ about an axis $B^2$, thus drawing the rod $K'$ out of engagement with the drum D and allowing the latter to be rotated by its weight and cable. The traveling arms F G and their connections constitute timing mechanisms to govern the locking and unlocking of both the two clutches and the two drums.

What we claim is—

1. In a planter, the combination with the frame and dropping mechanism thereon, of devices for operating said mechanism, an anchor to lie upon the ground, and a cable attached to said anchor and connected to said devices to actuate them through the virtual pull of the weight as the planter advances.

2. In a planter, the combination with a frame and dropping devices thereon, of an anchor to lie upon the ground, a cable operatively connecting the anchor and said devices, and automatic means for rewinding the cable at intervals.

3. In a corn-planter, the combination with dropping mechanism, of gearing for actuating said mechanism, two drums each actuating said gearing by its own rotation in the proper direction, cables winding upon said drums, respectively, anchors attached to the cables, respectively, to hold them and thus force the drums to rotate in said direction as the planter advances, and gearing acting automatically at intervals to rewind the cables.

4. The combination with dropping and marking devices, of mechanism for simultaneously operating both, an anchor to rest upon the ground, and a cable attached to said anchor and connected to said mechanism to actuate it.

5. The combination with a suitable frame and dropping mechanism supported thereon, of two drums revolubly mounted upon the frame, means whereby the rotation of either drum in the proper direction actuates said mechanism, cables winding upon the drums, respectively, anchors or weights attached to the cables and normally at rest upon the ground, and means for automatically rewinding each cable while the other is unwinding under the virtual pull of its weight.

6. The combination with a planter-frame, of marking devices carried by the frame, mechanism for operating said devices, an anchor normally at rest upon the ground while the planter advances, and a cable attached to said weight and operatively connected to said mechanism to actuate it.

7. The combination with a planter-frame carrying dropping mechanism, of drums revolubly mounted upon the frame and operating said mechanism by their own rotation, cables winding upon the drums, respectively, weights attached to the cables, respectively, and normally at rest upon the ground while the planter advances, means for locking each drum, and automatic devices for alternately unlocking the drums and rewinding their cables.

8. The combination with a suitable frame and dropping mechanism thereon, of a drum mounted upon the frame to operate said mechanism by its own rotation in one direction, a drum-rotating cable upon the drum, an anchor attached to said cable and normally resting upon the ground, whereby the drum is rotated in said direction as the frame advances, devices actuated by the planter's advance for rotating the drum in the contrary direction to rewind the cable, and automatic means for periodically throwing said devices into and out of action.

9. The combination with a planter-frame and dropping mechanism thereon, of suitably-mounted drums, cables winding upon the drums, respectively, anchors attached to the cables, respectively, and normally resting upon the ground, means whereby the dropping mechanism is actuated by unwinding rotation of either drum, and means for rotating the two drums in a contrary direction alternately.

10. The combination with a planter-frame bearing dropping mechanism, of drums fixed to shafts mounted upon the frame and each rotated in one direction by the rotation of the planter-wheels and in the other direction by cables attached to anchors normally resting upon the ground, a geared disk actuating the dropper mechanism, pinions mounted upon the drum-shafts, respectively, and engaging said disk, and pawl-and-ratchet mechanism compelling the pinions to rotate with their shafts in one direction but leaving them free while the shafts rotate in the contrary direction.

11. The combination with the frame and dropping mechanism thereon, of two drums upon the frame, means whereby each drum while rotating in one direction actuates said mechanism, means for locking each drum, means for rotating the drums independently in such direction, and means whereby each drum after a certain amount of rotation in such direction automatically unlocks the other.

12. The combination with the frame and dropping mechanism thereon, of two drums upon said frame, cables winding upon the drums, respectively, and each provided with an anchor to engage the ground and thus force its cable to unwind as the frame advances and thereby rotate its drum, means whereby such rotation actuates said mechanism, automatic means for rewinding each cable, after a certain amount of unwinding, and locking its drum, and means whereby the one drum unlocks the other during its own dropper-actuating rotation.

13. The combination with the wheel-supported planter-frame, of the dropping mechanism, a drum upon the frame, an anchor normally at rest upon the ground, a cable connecting the anchor to the drum and winding upon the latter, means whereby the rotation of the drum by the virtual pull of the anchor upon its cable actuates the dropper, gearing actuated from the wheels to rewind the cable, and means whereby the rotation of the drum by its cable throws said gearing into action at the proper time.

14. The combination with a wheel-supported planter-frame and dropping mechanism thereon, of a drum upon the frame, a cable winding upon the drum, an anchor attached to the cable to draw the latter and rotate the drum as the frame advances, devices operated from the wheels to rewind the cable, a threaded shaft rotated by the drum, an arm traveling upon said shaft, and means whereby the arm at the proper points in its path throws said devices into and out of operative connection with the drum.

15. The combination with a wheel-supported planter-frame bearing dropping mechanism, of a drum mounted upon the frame, a loose pinion upon the drum-shaft, pawl-and-ratchet devices compelling the pinion to rotate with the shaft in one direction only, a geared disk engaged by the pinion and provided with cam projections for actuating the dropping mechanism, an anchor, a cable connecting the anchor to the drum and winding upon the latter, and means for periodically rewinding the cable upon the drum.

16. The combination with the planter-frame bearing the dropping mechanism, of two drums revolubly mounted upon the frame, cables winding upon the drums, respectively, and each attached to its anchor, means for locking both drums forcing both anchors to move on with the machine, and devices operable by an attendant to unlock one of the drums at will.

Signed by us this 2d day of May, A. D. 1898.

ARLA J. HUGHES.
DAVID C. HINDMAN.

Witnesses:
PULASKI REEVE,
H. T. PEMBERTON.